(12) United States Patent
Vangala et al.

(10) Patent No.: US 10,361,619 B2
(45) Date of Patent: Jul. 23, 2019

(54) REALIZING ZVS AND ZCS IN A CCM BOOST CONVERTER WITH BCM CONTROL WITH A SINGLE SWITCH

(71) Applicants: Vignan Technology Business Incubator, Guntur (IN); Nagesh Vangala, Bangalore (IN); Rayudu Mannam, Bangalore (IN)

(72) Inventors: Nagesh Vangala, Bangalore (IN); Rayudu Mannam, Bangalore (IN); Srinivasa Rao Gorantla, Guntur (IN)

(73) Assignees: VIGNAN TECHNOLOGY BUSINESS INCUBATOR, Guntur (IN); Nagesh Vangala, Bangalore (IN); Rayudu Mannam, Bangalore (IN)

( * ) Notice: Subject to any disclaimer, the term of this patent is extended or adjusted under 35 U.S.C. 154(b) by 0 days.

(21) Appl. No.: 16/281,824

(22) Filed: Feb. 21, 2019

(65) Prior Publication Data
US 2019/0181743 A1  Jun. 13, 2019

(51) Int. Cl.
*H02M 3/156* (2006.01)
*H02M 1/08* (2006.01)
*H02M 3/335* (2006.01)
*H02M 1/34* (2007.01)
*H02M 1/00* (2006.01)

(52) U.S. Cl.
CPC ............. *H02M 1/083* (2013.01); *H02M 1/34* (2013.01); *H02M 3/33523* (2013.01); *H02M 2001/0058* (2013.01); *H02M 2001/342* (2013.01)

(58) Field of Classification Search
CPC ............................... H02M 3/156; H02M 3/157
See application file for complete search history.

(56) References Cited

U.S. PATENT DOCUMENTS

| 6,281,824 B1 * | 8/2001 | Masuda | ........... H03K 17/04113 341/144 |
| 2010/0308733 A1 * | 12/2010 | Shao | ................... H02M 1/4225 315/119 |

* cited by examiner

*Primary Examiner* — Gary L Laxton
(74) *Attorney, Agent, or Firm* — Mannava & Kang, P.C.; Vinay Malik

(57) ABSTRACT

Realizing ZVS and ZCS in a CCM Boost Converter with BCM control with a single switch. Embodiments disclosed herein relate to continuous conduction mode (CCM) boost converters and more particularly to continuous conduction mode (CCM) boost converters with boundary control mode. The embodiments herein achieve a scheme to achieve complete soft switching of all the switching elements of a boost converter, without incorporating any additional auxiliary switch, wherein total soft switching is achieved by inserting a fly back transformer in series with a normal boost converter operating in a continuous conduction mode, and adopting boundary control mode.

1 Claim, 15 Drawing Sheets

FIG. 4

| Input | Switching Frequency KHz | | | |
|---|---|---|---|---|
| Volts | 800W Output | | 400 W Output | |
| DC | Computed | Obtained | Computed | Obtained |
| 190 | 59 | 50 | 91 | 86 |
| 250 | 89 | 93 | 136 | 137 |
| 300 | 139 | 135 | 185 | 189 |

FIG. 5

| INPUT VOLTAGE VAC | LOAD W | PF | THD |
|---|---|---|---|
| 190 | 400 | 0.9910 | 12.3 |
| 220 | 400 | 0.9935 | 15.0 |
| 260 | 400 | 0.9967 | 22.0 |
| 190 | 600 | 0.9905 | 8.0 |
| 220 | 600 | 0.9920 | 11.3 |
| 260 | 600 | 0.9940 | 13.6 |
| 190 | 800 | 0.9900 | 3.5 |
| 220 | 800 | 0.9920 | 8.4 |
| 260 | 800 | 0.9928 | 11.0 |

FIG. 12A

| Lr μH | Cr | V in DC V | Pin W | Po W | Ploss W | Efficiency | F KHz |
|---|---|---|---|---|---|---|---|
| 100 | 1000 | 190 | 827.9 | 800 | 27.9 | 96.63% | 120 |
| 100 | 1000 | 220 | 818.9 | 800 | 18.9 | 97.70% | 161 |
| 100 | 1000 | 250 | 816.4 | 800 | 16.4 | 97.99% | 250 |
| 100 | 1000 | 300 | 815.9 | 800 | 15.9 | 98.05% | 294 |
| 100 | 2000 | 190 | 823.5 | 800 | 23.5 | 97.14% | 109 |
| 100 | 2000 | 220 | 820.9 | 800 | 20.9 | 97.45% | 138 |
| 100 | 2000 | 250 | 818.4 | 800 | 18.4 | 97.75% | 166 |
| 100 | 2000 | 300 | 817.9 | 800 | 17.9 | 97.81% | 263 |
| 200 | 1000 | 190 | 827.9 | 800 | 27.9 | 96.63% | 78 |
| 200 | 1000 | 220 | 816.7 | 800 | 16.7 | 97.96% | 106 |
| 200 | 1000 | 250 | 813.9 | 800 | 13.9 | 98.29% | 135 |
| 200 | 1000 | 300 | 809.9 | 800 | 9.9 | 98.77% | 200 |
| 200 | 2000 | 190 | 833.5 | 800 | 33.5 | 95.98% | 50 |
| 200 | 2000 | 220 | 823.2 | 800 | 23.2 | 97.18% | 72 |
| 200 | 2000 | 250 | 818.9 | 800 | 18.9 | 97.70% | 93 |
| 200 | 2000 | 300 | 809.9 | 800 | 9.9 | 98.77% | 135 |

FIG. 12B

| Lr μH | Cr pF | V in DC V | Pin W | Po W | Ploss W | Efficiency | F KHz |
|---|---|---|---|---|---|---|---|
| 200 | 1000 | 180 | 305.5 | 300 | 5.5 | 98.20% | 156 |
| 200 | 1000 | 220 | 305.7 | 300 | 5.7 | 98.13% | 185 |
| 200 | 1000 | 250 | 305.2 | 300 | 5.2 | 98.29% | 256 |
| 200 | 1000 | 300 | 306.7 | 300 | 6.7 | 97.82% | 370 |
| 200 | 1000 | 180 | 407.3 | 400 | 7.3 | 98.20% | 133 |
| 200 | 1000 | 220 | 406.2 | 400 | 6.2 | 98.46% | 182 |
| 200 | 1000 | 250 | 406.9 | 400 | 6.9 | 98.29% | 218 |
| 200 | 1000 | 300 | 407.9 | 400 | 7.9 | 98.05% | 333 |
| 200 | 1000 | 180 | 616.7 | 600 | 16.7 | 97.30% | 96 |
| 200 | 1000 | 220 | 611.4 | 600 | 11.4 | 98.13% | 139 |
| 200 | 1000 | 250 | 610.4 | 600 | 10.4 | 98.29% | 166 |
| 200 | 1000 | 300 | 607.4 | 600 | 7.4 | 98.77% | 263 |
| 200 | 1000 | 180 | 827.9 | 800 | 27.9 | 96.63% | 78 |
| 200 | 1000 | 220 | 816.7 | 800 | 16.7 | 97.96% | 106 |
| 200 | 1000 | 250 | 813.9 | 800 | 13.9 | 98.29% | 133 |
| 200 | 1000 | 300 | 809.9 | 800 | 9.9 | 98.77% | 200 |

REALIZING ZVS AND ZCS IN A CCM BOOST CONVERTER WITH BCM CONTROL WITH A SINGLE SWITCH

CROSS REFERENCE TO RELATED APPLICATION

This application is based on and derives the benefit of Indian Provisional Application 201841007010, the contents of which are incorporated herein by reference.

TECHNICAL FIELD

Embodiments disclosed herein relate to continuous conduction mode (CCM) boost converters and more particularly to continuous conduction mode (CCM) boost converters with boundary control mode.

BACKGROUND

Soft switching is a technique used in power converters. Soft switching can implemented in all the DC-DC converters such as buck, boost and bridge converters. Nevertheless, achieving complete soft switching for full bridge and push pull converters, wherein two or more active switches are already present, is relatively easy compared to boost converters. Soft switching improves system efficiency, allows for high frequency of operation and generates less EMI (Electromagnetic Interference).

Generally, soft switching is achieved either with the help of active snubbers, or by incorporating an auxiliary switch or with resonant switching.

FIG. 1 depicts a conventional boost regulator. $L_b$ is the boost inductor, $SW_1$ is the main switch, $D_b$ is the boost diode and $C_o$ the output capacitor. Energy is stored in the boost inductor when $SW_1$ is ON for $T_{on}$ duration and the same energy is delivered to the load adding up to input voltage when $SW_1$ goes OFF for $T_{off}$ duration. Output voltage $V_0$ is regulated by varying the duty cycle of $SW_1$ and $V_0$ is always higher than the input voltage $V_{in}$. The input and output voltages are related by $$V_0 = V_{in}/(1-D)$$

where D is the duty cycle defined as $$T_{on}/(T_{on}+T_{off}) \quad (1)$$

Though Continuous Conduction Mode (CCM) control of the boost converter provides lower input peak currents and associated lower losses, it also has some disadvantages such as reverse recovery problem of the boost diode and also Right Half plane Zero stability issue. Especially at high frequencies and higher output voltages, the reverse recovery of the boost diode causes enormous stress on the boost switch and the losses in the switch can turn out to be detrimental.

A Boundary Conduction Mode (BCM) boost converter does not have the reverse recovery issue with boost diode and also the Right Half Plane issue. This mode is widely adapted for the lower power levels up to say 200 to 300 Watts. Since the inductor ($L_b$) current starts from zero value in each switching cycle, the peak currents are much larger, and in some cases, it can be as high as 6 times the average current. Therefore for higher power levels in the region of 500 watts and above, BCM is not tenable.

In CCM boost converter, the boost switch turns ON and OFF with reasonable currents, depending on the output power level. Drain Voltage swing also will be from zero to the output voltage.

The switching losses in the boost switch can be computed as $$P_{sw} = I\text{in}_{max} * V_0 * (t_{on}+t_{off})/T*2 \quad (2)$$

wherein $I\text{in}_{max}$ is the input current through the switch at the end of ON time, T is the time period of the switching cycle, $t_{on}$ and $t_{off}$ are the rise and fall times of the switch.

The switching power loss in the switch for a 1.0 kW boost converter, operating with 220V DC input, and 400 VDC output and switching around 200 kHz, would be around 25 Watts. Such a large dissipation in a single semiconductor device poses a big challenge in the practical applications.

Another contributor is the power loss in the boost switch due to reverse recovery of the boost diode. When the boost diode is turned OFF, it does not block the current to zero instantaneously, and thus acts like a short circuit for the reverse recovery time. The entire output voltage is impressed across the boost switch, which is in the ON state. For the duration of reverse recovery of the boost diode, the boost switch is stressed enormously. The loss induced thus, is regenerative in nature and may cause the thermal runaway of the boost switch at high frequencies. Further, the loss induced by the energy stored in the output capacitance $C_{oss}$ of the boost switch at 400V DC is added to this. Assuming a capacitance of about 200 Pf, the loss due to this can be as much as 3.0 Watts. Therefore nullifying the switching losses (soft switching) improves the system efficiency and also the reliability.

It can be seen that most of the current schemes have extra active switches and a higher number of power components to achieve soft switching.

OBJECTS

The principal object of embodiments herein is to disclose a scheme to achieve complete soft switching of all the switching elements of a boost converter in Continuous Conduction Mode (CCM), without incorporating any additional auxiliary switch, wherein total soft switching is achieved by inserting a fly back transformer in series with a normal boost inductor operating in a continuous conduction mode, and adopting Boundary Control Mode (BCM).

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which:

FIG. 4 is a table comprising of the theoretically computed frequencies and practically obtained frequencies, according to embodiments as disclosed herein;

FIG. 5 is a table depicting the power factor and current Total Harmonic Distortion (THD) at various input voltages and loads when used as a power factor correction circuit, according to embodiments as disclosed herein;

FIGS. 12A and 12B is a table depicting the performance of the converter with varying input voltage, $L_r$ and $C_r$, according to embodiments as disclosed herein.

DETAILED DESCRIPTION

Figure 1:
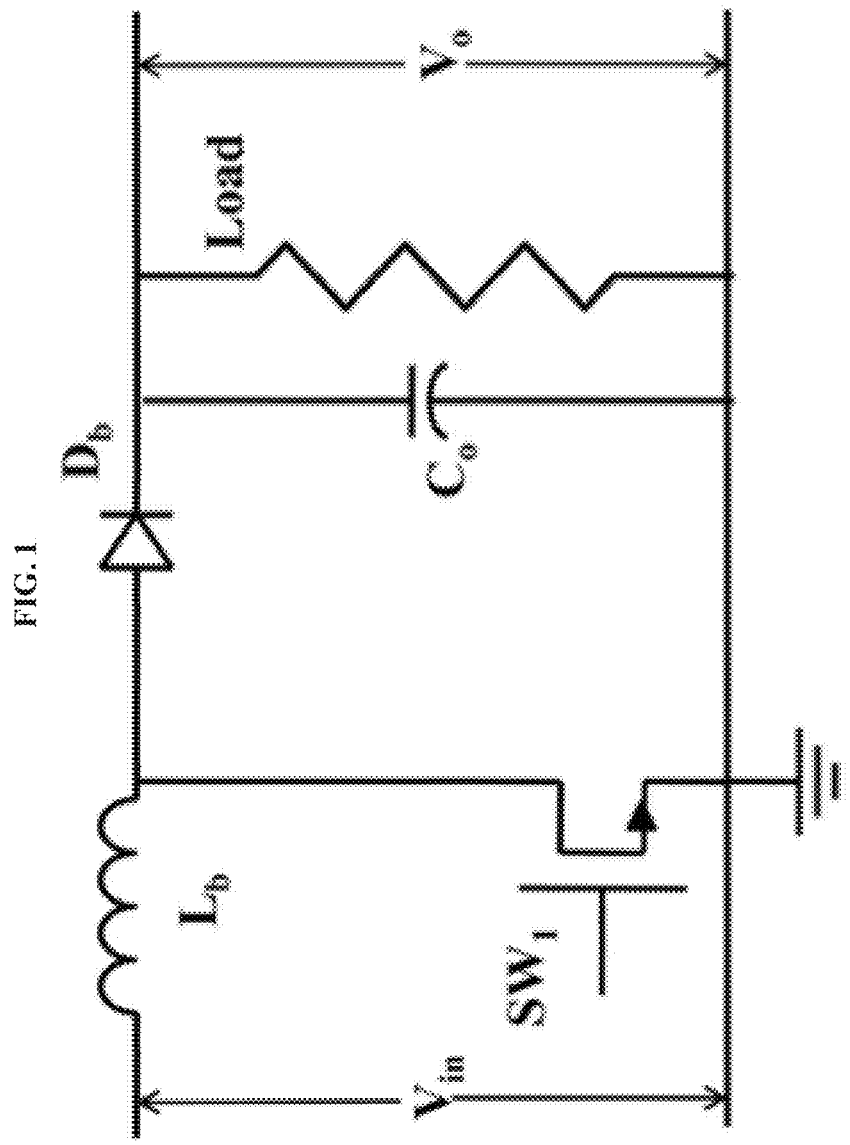
FIG. 1 depicts a conventional boost regulator.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a scheme to achieve complete soft switching of all the switching elements of a boost converter in Continuous Conduction Mode (CCM), without incorporating any additional auxiliary switch, wherein total soft switching is achieved by inserting a fly back transformer in series with a boost inductor operating in a continuous conduction mode, and adopting Boundary Control Mode (BCM). Referring now to the drawings, and more particularly to FIGS. 2A through 12B, where similar reference characters denote corresponding features consistently throughout the figures, there are shown embodiments.

Embodiments herein reduce or avoid the switching stress in a boost converter operating at high frequency and high power levels, enabling adoption of embodiments disclosed herein for power factor correction applications. Embodiments herein can achieve zero current and zero voltage switching for all the switching elements of the converter, without adding any auxiliary MOSFET (Metal Oxide Semiconductor Field Effect Transistor) and use of control techniques. Embodiments herein achieve soft switching of all the power devices, which improves the efficiency and also reduces the Electro-Magnetic Interference (EMI). Embodiments herein can be used for ensuring power factor correction (PFC), wherein a BCM controller is used to achieve PFC at high power levels and in CCM.

Embodiments herein switch ON the boost switch with zero current by incorporating a resonant inductor in the drain path of the boost switch, hereby ensuring that the current through the switch is zero while the boost switch is ON.

When the switch is fully ON and carrying the input current, along with a boost inductor, embodiments herein enable the resonant inductor to store energy. The energy stored in the resonant inductor can be recycled/recovered to the output or input, without wasting it. This arrangement ensures soft switching for the boost switch.

To avoid turn OFF losses, embodiments herein hold the boost switch voltage at zero value when the switch is being turned OFF by a gate signal. This ensures zero voltage switching at turn OFF. This can be done by adding a resonant capacitance across the boost switch, which will delay the rise of drain voltage at turn OFF.

Embodiments herein enable the energy stored in the resonant capacitance to be recovered usefully.

Embodiments herein bring down the resonant capacitance voltage to zero value, just at the instance of turn ON of the boost switch, hereby ensuring zero voltage switching at turn ON.

Embodiments herein use a control parameter. The control parameter will vary constantly (and keeping the OFF time reasonably constant) based on line and load conditions, ensuring lossless switching of the boost switch at all times. Embodiments herein use switch frequency as an example of the control parameter. The frequency will vary constantly (and keeping the OFF time reasonably constant) based on line and load conditions, ensuring lossless switching at all times. However, it may be obvious to a person of ordinary skill in the art to use any other suitable parameter as the control parameter.

Figure 2A:
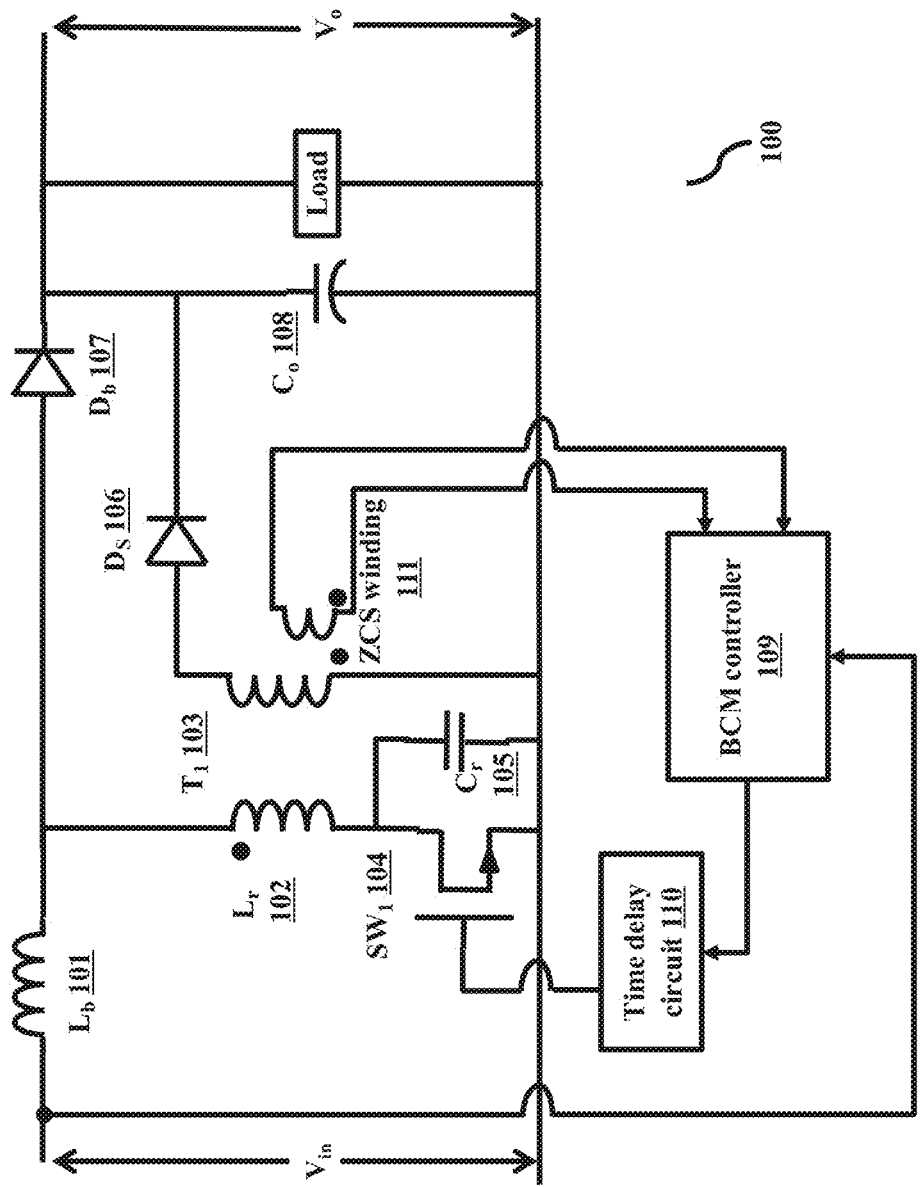
FIGS. 2A and 2B depict a boost converter, according to embodiments as disclosed herein.
Figure 2B:
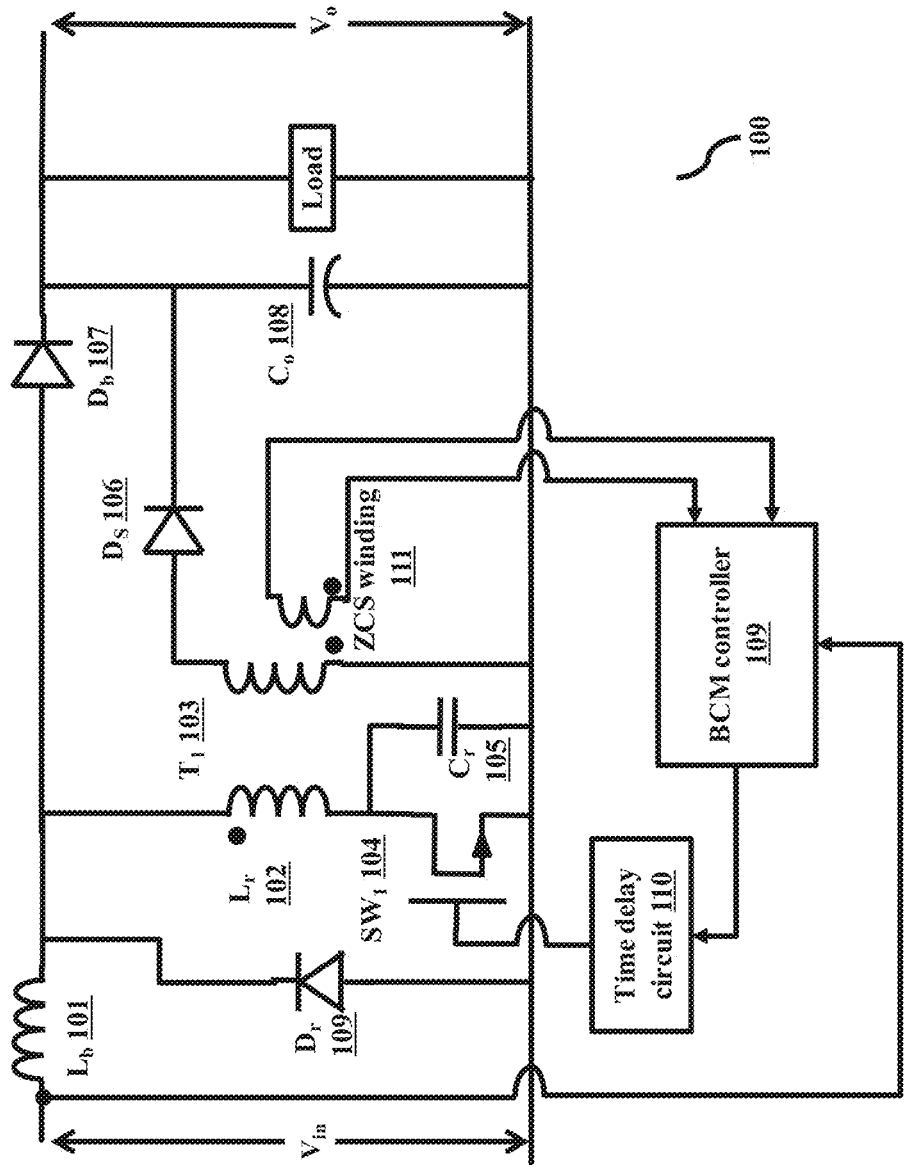

FIGS. 2A and 2B depict a boost converter, according to embodiments as disclosed herein. The boost inductor can be split in to two portions, a first portion ($L_b$ 101) and a second portion ($L_r$ 102). $T_1$ 103 is the fly back transformer, whose primary $L_r$ 102 is connected in series with the switch 104. The $T_1$ 103 can be made to operate in the Boundary conduction mode (BCM) by a BCM controller 109, so as to achieve soft switching.

The BCM controller 109 has zero current detect facility and generates appropriate control signals for the switch ($SW_1$) 104. The BCM controller 109 can receive inputs from the input side and a Zero Current Switching (ZCS) winding 111, present on the $T_1$ 103. The output of the BCM controller 109 can be connected to the gate of the $SW_1$ 104, through a time delay circuit 110. $SW_1$ 104 is the main switch (the boost switch), $D_b$ 107 is the boost diode and $C_o$ 108 is the output capacitor.

In an embodiment herein, a resonance diode ($D_r$) 109 can be connected across the switch 104 and the flyback transformer 103 (as depicted in FIG. 2B). $D_r$ 109 can aid in snubbing the unwanted ringing due to parasitic capacitances.

In an embodiment herein, the switch 104 can be at least one of a MOSFET switch, a bipolar transistor, and an insulated-gate bipolar transistor (IGBT). Embodiments herein are further explained considering that the switch 104 is a MOSFET switch, but it may be obvious to a person of ordinary skill in the art that any other form of suitable switch may be used (such as a bipolar transistor, an IGBT, and so on).

$L_r$ 102 is derived from the primary of the fly back transformer $T_1$ 103. The secondary of $T_1$ 103 is tied to the output voltage ($V_o$) via $D_s$ 106 (a fly back diode). The turns-ratio of the transformer $T_1$ 103 is chosen to be 1:1 to induce $2V_0$ at the drain of $SW_1$ 104, while the $SW_1$ is turned OFF.

When the boost switch 104 is OFF, the load current is supplied by the first portion of the boost inductor ($L_b$) 101. Current through the boost inductor 101 is linearly decreasing with a slope proportional to $(V_0-V_{in})/L_b$. The boost diode ($D_b$) 107 also carries the same current. Prior to switch $SW_1$ 104 turn ON, the value of this current is $Iin_{min}$. The current in the primary of $T_1$ 103 is zero.

When the switch 104 is turned ON, since the current through $L_r$ 102 was initially zero, the boost switch 104 turns ON under ZCS (Zero Current Switching) mode. The current in $L_r$ 102 starts to rise linearly, and builds up to $Iin_{min}$. At this instance, the current in the $D_b$ 107 falls to zero and the $D_b$ 107 switches off under zero current. $L_b$ 101 current $Iin_{min}$ starts flowing in to $L_r$ 102 and the switch 104 and the current rises gradually with a slope of $V_{in}$. It is to be noted that due to parasitic and stray capacitances at the anode of the $D_b$ 107, the current in the switch 104 shall be slightly more than the $Iin_{min}$ and the voltage shall be zero at the cathode of $D_r$ 109. At the end of $T_{on}$, the boost inductor current value is $Iin_{max}$. $Iin_{max}-Iin_{min}$ is the ripple current in the boost inductor 101.

When the switch 104 is turned OFF again, $Iin_{max}$ starts charging $C_r$ 105 and the drain voltage rises gradually. This condition allows the $SW_1$ 104 to turn OFF with zero voltage. When the drain voltage reaches $V_0$, the current in $L_b$ 101 is diverted to output. The current flowing in $L_r$ 102 will force the drain voltage to further rise than $V_0$, and when this voltage is sufficient enough to induce a positive voltage in the secondary of the $T_1$ 103, diode $D_s$ 106 conducts and clamps the voltage at secondary to $V_0$.

Subsequently, the energy stored in the $L_r$ 102 is transferred to the output. Choosing the turn's ratio of windings of $T_1$ 103 to be unity, the drain voltage of $SW_1$ 104 shall be clamped to $2V_0$. The voltage stress on the drain is dependent on the turns-ratio of the primary and the secondary of $T_1$ 103 (neglecting the leakage inductance of $T_1$ 103). It is essential to choose the drain voltage to be at least 2, so that $C_r$ 105 can store sufficient energy to transfer to the $L_r$ 102 at a later stage. This in turn would discharge $C_r$ 105 down to zero to achieve ZVS at turn ON.

Once $D_s$ 106 conducts, stored energy in $L_r$ 102 is quickly transferred to the load. The duration of the transfer is depending on the initial current transferred, the output voltage and the secondary inductance which is equal to $L_r$. The BCM controller 109 senses the zero current point in $T_1$ 103 and turns ON the boost switch 104 after a pre-determined delay (half resonant period of $L_r$ 102 and $C_r$ 105).

Embodiments herein ensure complete energy transfer mode for $T_1$ 103 under all operating conditions and thus ensures ZCS for main switch $SW_1$ 104, diode $D_s$ 106 and $D_b$ 107 at all times.

After the energy in $T_1$ 103 is completely transferred, $L_r$ 102 and $C_r$ 105 form resonant elements with initial current to be zero in the resonant circuit and voltage at $C_r$ 105 being equal to $2V_0$. Energy from $C_r$ 105 gets transferred to $L_r$ 102 till the drain voltage reaches $V_0$ value. Subsequently current in $L_r$ 102 discharges the $C_r$ 105 and the drain voltage of the $SW_1$ 104 reaches zero in half the resonant time period of $L_r$ 102 and $C_r$ 105. Therefore in half the resonant time period, the drain voltage will reach zero value from $2V_0$. This is the optimum time for the switch 104 to come on again. Hence if a delay time equal to half the resonant time of $L_r$ 102 and $C_r$ 105 is incorporated after detecting the zero current condition, while turning on the boost switch, ZVS at turn ON is guaranteed. The BCM controller 109 can use the time delay circuit 110 for adding the delay time, equal to half the resonant time of $L_r$ 102 and $C_r$ 105. The ON time ($T_{on}$) is varied, to achieve boost and regulation functions, by the BCM controller 109. The BCM controller 109 varies the frequency (the control parameter) to maintain the requisite duty cycle.

The scheme as disclosed herein can comprise of the following modes:

Mode 1: $SW_1$ 104 is OFF and the boost inductor 101 is supplying the load. $D_b$ 107 is conducting and the initial current in $L_r$ 102 is zero. $SW_1$ 104 is turned ON at this instance.

Mode 2: $SW_1$ turns ON with zero current. The current in $SW_1$ and also $L_r$ begins to rise linearly. This mode ends when the current in the switch reaches $Iin_{min}$.

Mode 3: The diode $D_b$ 107 turns OFF with zero current. Current in the $SW_1$ 104 and $L_r$ 102 continues rise. This mode ends when the current in the $SW_1$ 104 attains $Iin_{max}$ and the BCM controller 109 turns OFF the switch.

Mode 4: $SW_1$ 104 turns OFF with zero voltage due to $C_r$ 105. $Iin_{max}$ starts charging $C_r$ 105. Voltage at $C_r$ 105 gradually rises and this mode ends when it reaches.

Mode 5: At this instance, the current $Iin_{max}$ in the $L_b$ 101 is diverted to the output and the energy is transferred to the output. $L_r$ 102 continues to charge $C_r$ 105 and this phase ends when the voltage at $C_r$ 105 reaches 2. The time taken for $C_r$ 105 to rise from to 2 is lower than the quarter of the resonant time of $L_r$ 102 and $C_r$ 105.

Mode 6: At this instance, the secondary of $T_1$ 103 develops a voltage equal to and hence diode $D_s$ 106 conducts. Stored energy in $L_r$ 102 is transferred to the output. This mode ends when the current in the secondary reduces to zero and $D_s$ 106 turns off with zero current. Thus, the energy stored in $L_r$ 102 due to $Iin_{max}$ is divided in to charging $C_r$ 105 and the balance is transferred to the output.

Mode 7: Resonance occurs between $L_r$ 102 and $C_r$ 105 and the energy from $C_r$ 105 is first transferred to $L_r$ 102. Voltage at $C_r$ 105 decreases sinusoidal and the current in $L_r$ 102 builds up. The direction of the current in $L_r$ 102 is reversed now. This mode ends when the $C_r$ 105 voltage reaches.

Mode 8: At this instance $L_r$ 102 sees zero voltage across it and the current in $L_r$ 102 tries to remain constant.

Figure 3:
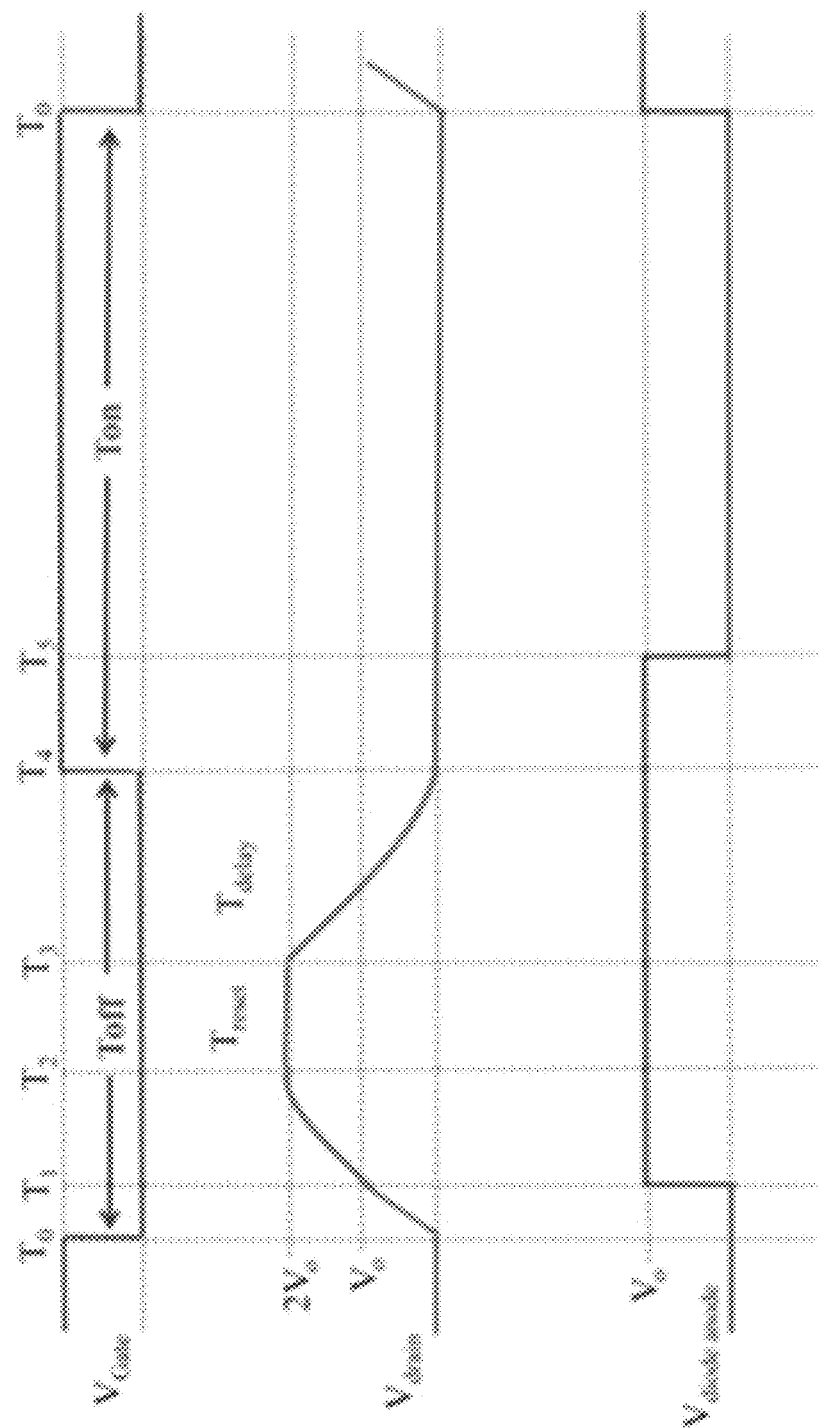
FIG. 3 depicts the timing chart, according to embodiments as disclosed herein.

Since $C_r$ 105 voltage cannot be held constant, it starts decreasing. Time taken for the $C_r$ 105 voltage to come down to zero value starting at 2 is half the resonant time period of $L_r$ 102 and $C_r$ 105. At this instance, $SW_1$ 104 is turned ON again by the BCM controller 109 with ZVS and Mode 1 again repeats. The timing chart is depicted in FIG. 3.

Prior to $T_0$, the switch $SW_1$ 104 is ON and the boost diode 107 is OFF. The load current is supplied by the output capacitor 108 and the input current is $Iin_{max}$ flowing through the boost switch 104, the boost inductor 101 and the $L_r$ 102. At $T_0$, the switch $SW_1$ 104 is turned OFF by the BCM controller 109.

$T_0$-$T_1$: Due to the capacitor $C_r$ 105, the switch $SW_1$ 104 turns OFF with zero voltage and the current $Iin_{max}$ gradually charges the $C_r$ 105 and the drain voltage starts rising. At $T_1$, the drain voltage reaches the value $V_0$, the output voltage. At this point, the current in the boost inductor $Iin_{max}$ gets diverted to the output, by turning ON the boost diode 107. This duration can be approximated to the linear rise in voltage due to large value of $L_b$ 101 and $L_r$ 102 and considering them as current sources.

$T_1$-$T_2$: In this duration, the resonance occurs between $L_r$ 102 and $C_r$ 105 and the drain voltage starts building up further due to the energy transfer from $L_r$ 102 to $C_r$ 105. This increase can happen till the energy in $L_r$ 102 reaches a zero value and the drain voltage reaches a peak value. Maximum value attainable at $C_r$ 105 over and above is given by $$Iin_{max} * \sqrt{(L_r/C_r)} \qquad (3)$$

However, by design when $C_r$ 105 voltage reaches $2V_0$, the diode $D_s$ 106 conducts and clamps the drain voltage to $2V_0$ at $T_2$. This time duration shall be less than one quarter of resonant time period of $L_r$ and $C_r$ 105 and is given by $$\left(\frac{\Pi}{180}\right) * \sqrt{L_r * C_r} * \sin^{-1}\left(V_o / \left(Iin_{max} * \sqrt{(L_r/C_r)}\right)\right) \qquad (4)$$

Denoting this duration as $t_{ch}$, it can be approximated to about 5% of the resonant period of $L_r$ 102 and $C_r$ 105.

$T_2$-$T_3$: During this period, the balance energy in $L_r$ 102 is transferred to the output. At $T_3$, the energy in the $L_r$ 102 is completely depleted and therefore the Zero Current Detection (ZCD) signal in the BCM controller 109 changes its state from HIGH to LOW. This duration is titled as $T_{reset}$ and is determined by $V_0$, $Iin_{max}$ and $L_r$ 102 (because the fly back transformer turns ratio is chosen to be 1:1). $T_{reset}$ is $L_r * Iin_{max}/$.

$T_3$-$T_4$: In a normal boundary mode controller operation, the MOSFET switch $SW_1$ 104 is turned ON immediately by the BCM controller 109, the moment ZCD signal changes its state from HIGH to LOW. Embodiments herein introduce a deliberate delay $t_d$ (using the time delay circuit 110) in turning ON the $SW_1$ 104 after ZCD changes its state. At $T_3$, the complete energy in the transformer $T_1$ 103 is depleted and the drain voltage at $C_r$ 105 is at $2V_0$. The resonance starts between $L_r$ 102 and $C_r$ 105 at this point, because the switch 104 is still OFF and the BCM controller 109 has not yet sent the ON signal. The drain voltage starts decreasing sinusoidally due to energy transfer from $C_r$ 105 to $L_r$ 102. After drain voltage reaches $V_0$, $L_r$ 102 takes over and starts discharging $C_r$ 105 further. The drain voltage will reach to zero value at $T_4$ and the duration of $T_4$ to $T_3$ is the half resonant time period of $L_r$ 102 and $C_r$ 105. The delay time $t_d$ is set to this half resonant time, so that the $SW_1$ 104 turns ON at $T_4$. This achieves the Zero voltage switching at turn on for the boost switch. The switch OFF time $T_{off}$ is fixed as $T_0$ to $T_4$. It is to be noted that at $T_4$ when the switch is turned ON, the current in the $L_r$ 102 is zero and therefore the switch $SW_1$ 104 turns ON with zero current, even though the boost diode 107 is still conducting and the current in $L_b$ 101 is continuous and decreasing and is at a value $Iin_{min}$.

The ON time of the switch $SW_1$ 104 can be determined by applying the Volt second balance across the boost inductor $L_b$ 101.

$T_{off}$ can be termed to be fairly constant (though it may vary depending on the load current). $T_{on}$ varies largely with line and load, to maintain the total soft switching and regulating the output voltage.

The following design equations ensure the ZVS and ZCS for the main boost switch while operating in the continuous conduction mode. Prime facilitator for this is in maintaining approximately constant OFF time and allowing the switching frequency as a variable component.

$V_{in}$ is the input DC voltage, is the output voltage, $T_{off}$ is the switch off time, $T_{on}$ is the switch ON time and $T=T_{on}+T_{off}$ is the total time period of the switching cycle. $t_{rr}$ is the reverse recovery time of the boost diode. $t_{on}$ and $t_{off}$ are the rise and fall times of the boost switch 104.

As a starting point, $C_r$ 105 is initially selected to achieve ZVS during switch transiting from ON to OFF state. $C_r$ 105 should be capable of holding the drain voltage to a value which is considerably lower than the for the entire duration of $t_{off}$ at an input condition where in the input current is at its maximum value. Assuming the maximum input current to be 5.0 Amps (at 190V DC input and maximum power out) and worst case $t_{off}$ to be 0.1 μs, the $C_r$ 105 value can be determined by holding the voltage at $C_r$ to around 250V DC, $$C_r = 5 * 0.1 * 10^{-6}/250 = 2000 \text{ pf}.$$

This value ensures that drain voltage does not reach 250V during the process of switching 5.0 Amps current through it. After $C_r$ 105 has been selected, $L_r$ 102 can be arrived at in the following way. $L_r$ 102 and $C_r$ 105 can determine the switching frequency of the converter. The maximum switching frequency occurs at high input and minimum load.

Assuming minimum load to be 20% of the full load and the maximum input to be 300V DC, the maximum switching frequency can be fixed to say 300 KHz. Then, $T_{off}$ can be approximated to 2.5 μs.

As stated earlier, $$T_{off} = T_{reset} + t_d + t_{ch} \qquad (5)$$

$$T_{reset} = L_r * I_{inmax}/V_o \qquad (6)$$

$$t_d = \Pi * \sqrt{(L_r * C_r)} \qquad (7)$$

$$t_{ch} = 0.1\Pi * \sqrt{(L_r * C_r)} \qquad (8)$$

From the above equations, $L_r$ 102 can be derived.
Applying volt seconds balance for $L_b$ 101, $$(V_o - V_{in}) * (T_{off} + T_{reset}) = V_{in} * (T_{on} - T_{reset}) \qquad (9)$$

From this, $T_{on}$ can be computed.

The designed value for $L_r$ 102 and $C_r$ 105 for the power of 800 watts at an input of 250 V DC and an output of 400 V DC are listed below estimating the switching frequency to be around 100 KHz.

$$L_r = 200 \text{ μH}$$

$$C_r = 2000 \text{ pF}$$

To implement the above briefed technique, a control scheme is adapted by the BCM controller 109. There are many integrated circuits liberally available in the industry to build boundary conduction mode BCM flyback converters. These can be effectively made use of to derive the ZVS, ZCS boost regulator in the continuous conduction mode. In an example implementation herein, FAN 7527, by FAIRCHILD developed for a Boundary conduction mode flyback converter for PFC applications has been effectively used as the BCM controller 109. FAN 7527 has all the features built in to build a boundary conduction mode PFC flyback converter. It achieves BCM function, by detecting a zero current in the inductor/transformer and then immediately switching ON the switch 104. The $I_{det}$ pin in the controller 109 can be used for this. As long as this pin is held HIGH, the switch 104 is in OFF condition and the moment the pin is pulled to LOW state, the switch 104 is turned ON. The $I_{det}$ pin should be held LOW for the switch 104 to turn ON. Therefore, this pin is made use of to achieve delayed ON time function. $I_{det}$ pin can be connected to the time delay circuit 110, which introduces the needed delay after zero current detection.

A boost converter with the following specifications was built to demonstrate the technique.
Input voltage nominal: 220V DC (varying from 190V DC to 300V DC)
Output voltage: 400 V DC
Output power: 800 Watts
Desired switching frequency: range of 100 KHZ.

The designed and chosen values of $L_r$ and $C_r$ are 200 µH and 2000 pF respectively. These values were arrived at by making use of the above provided equations.

With the specified $L_r$ and $C_r$ values, at nominal input of 220V DC and full load of 800 Watts, the computed $T_{off}$ and $T_{on}$ are as under:

$T_{off}$=4.825 µs $T_{on}$=8.721 µs time period $T$=13.545 µs.

This translates to a switching frequency of 73.8 KHz. The measured frequency in the practical model was 72 KHz, which is an excellent correlation. Likewise, at a maximum input of 300V DC and an output power of 300 Watts, the computed $T_{off}$=2.95 µs and $T_{on}$=1.98 µs. Total time period T=5.49 µs. This translates to a switching frequency of 202.8 KHz, whereas practically it was measured to be 200 KHz. Under all the above conditions, total soft switching was maintained and efficiency varied from 96.8% at full load and 220V DC input to 98% at 300V DC input and 300 watts output condition.

Since the switching frequency went down to 50 KHz at 190V DC input and full load, the $L_r$ value was reduced to 100 microhenries and the readings were noted. With this $L_r$, the observed lowest frequency was 116 KHz at 800 watts output and 190V DC input.

The highest frequency recorded was 300 KHz at 300 V DC input and 300 watts output. Likewise, $C_r$ was also varied and readings tabulated.

The same unit was operated with an AC input in the range of 190V AC to 260V AC and at a load of 800 watts. The power factor was obtained and the input current waveform and the current THD are also recorded and presented here.

Theoretically computed frequencies and practically obtained frequencies in proto-converter are tabulated for comparison in FIG. 4.

A boost regulator was fabricated as per the above design guidelines and the test data are gathered. The crucial waveforms of gate drive, and drain voltage are recorded. ZVS and ZCS functions were attained for the entire line variation of 190V DC to 300V DC at all loads which maintain the continuous conduction mode.

Embodiments herein automatically achieve a very high frequency of operation in the ranges of above 100 KHz, which is an added advantage. Embodiments herein can achieve low levels of EMI as compared to hard switched converters. Soft switching of the switching devices in the converter aids in the lower EMI.

The gate and drain voltage waveforms are captured for different line and load conditions and are presented. These were captured for DC input conditions so as to specifically denote the soft switching. The ultimate aim of the product is to build a power factor correction circuit operating in CCM.

Power factor correction module for a medium and high power output shall be invariably a CCM boost regulator. All the soft switched PFC modules have one more additional switches to perform soft switching, whereas in the proposed scheme, no additional power switch is incorporated and no additional control burden is sought. An 800 watt boost regulator as described above, was fed with AC input voltage in the range of 190V AC to 264V AC and the obtained waveforms for input current, PF values and THD are presented here.

FIG. 5 is a table which depicts the power factor, and total harmonic distortion levels obtained in the converter (as depicted in FIGS. 2A and 2B). Further, the table also depicts the PF values and THD for varying input AC voltages and different load conditions.

Figure 6:
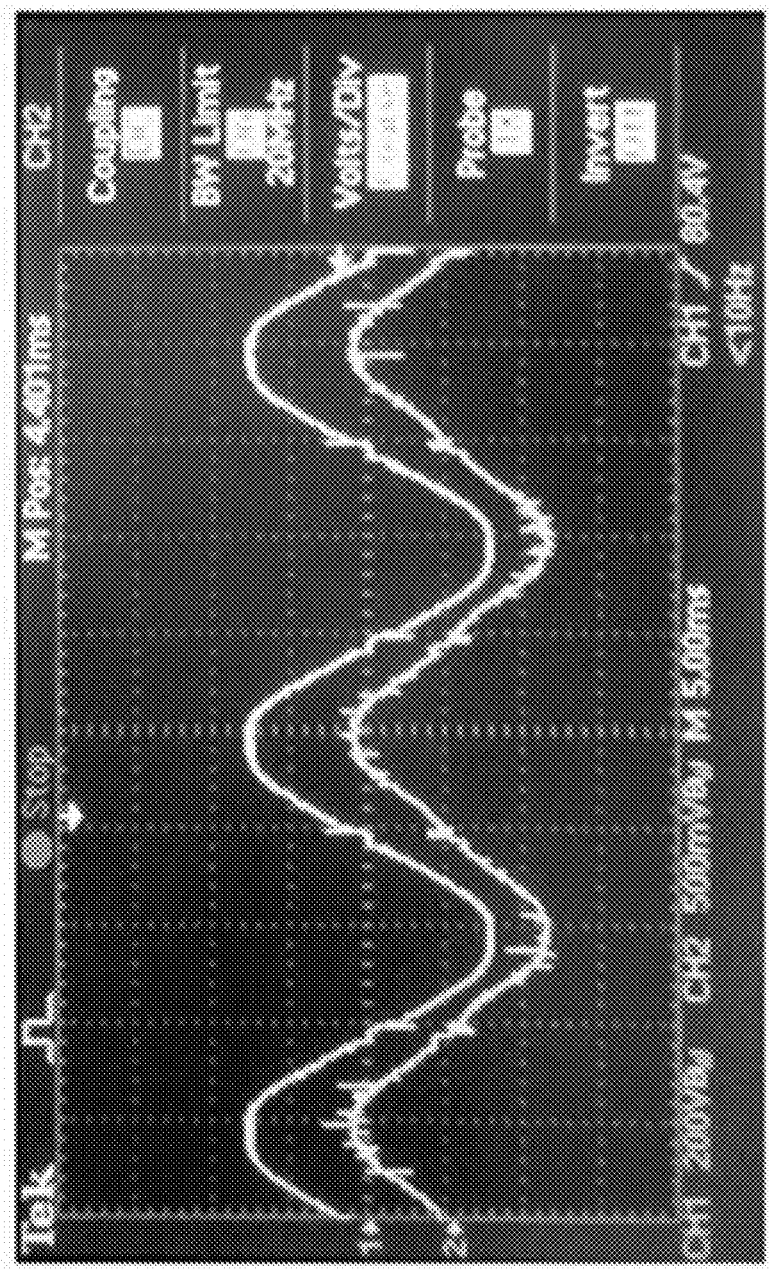
FIG. 6 is the input current at 230 VAC showing unity power factor under a 800 W load, according to embodiments as disclosed herein.

FIG. 6 depicts the input AC current wave shape measured in the converter (as depicted in FIGS. 2A and 2B) at a full load of 800 watts and an input of 230V AC. The proto-converter does not comprise any input line filter and even under such conditions, the input current diodes did not have any high frequency component which clearly indicates the CCM operation of the boost converter.

Figure 7:
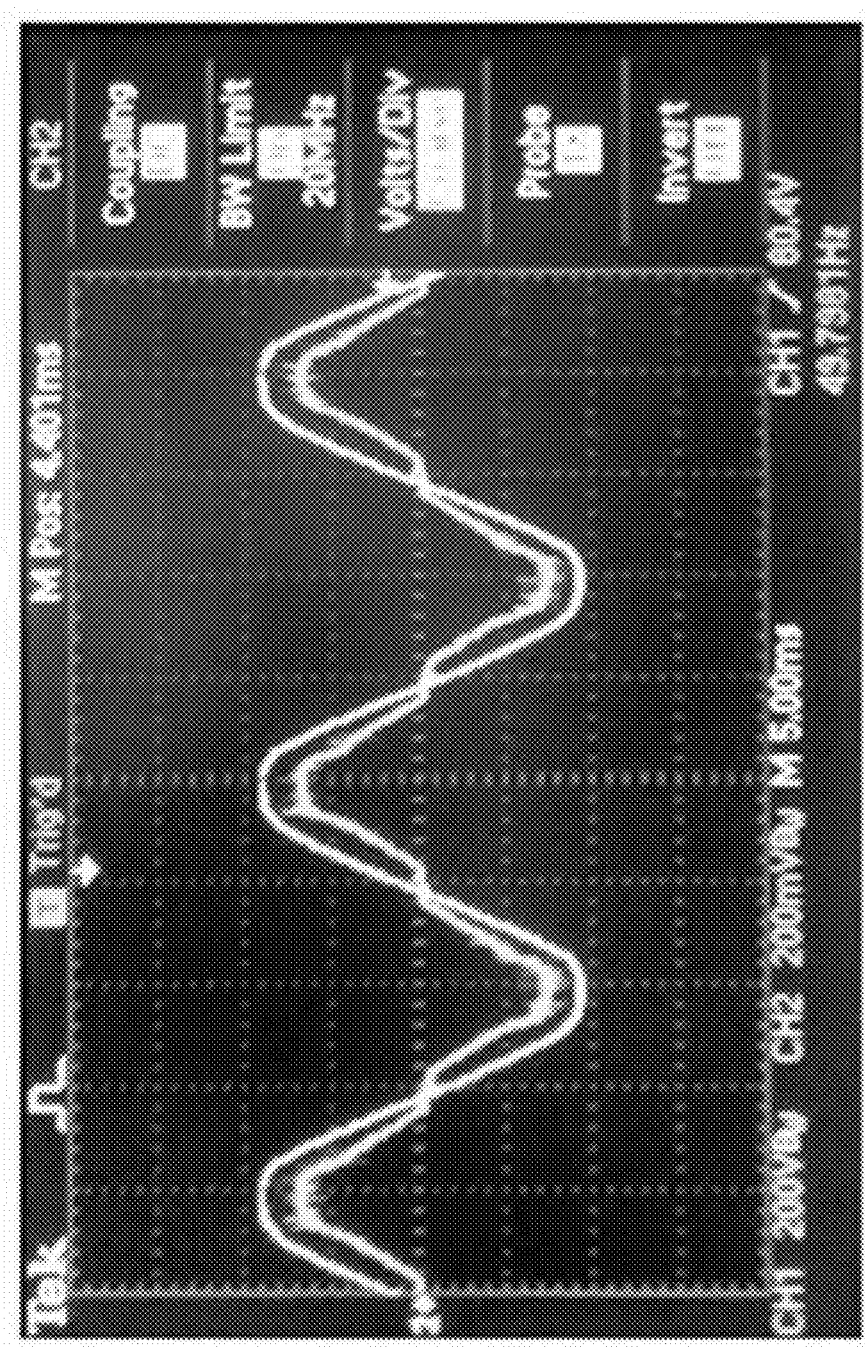
FIG. 7 is the input current at 260 VAC showing unity power factor under a 400 W load, according to embodiments as disclosed herein.

FIG. 7 depicts the input current wave shape for 400 watts (Half load) output and highest input AC voltage of 260V AC.

Figure 8:
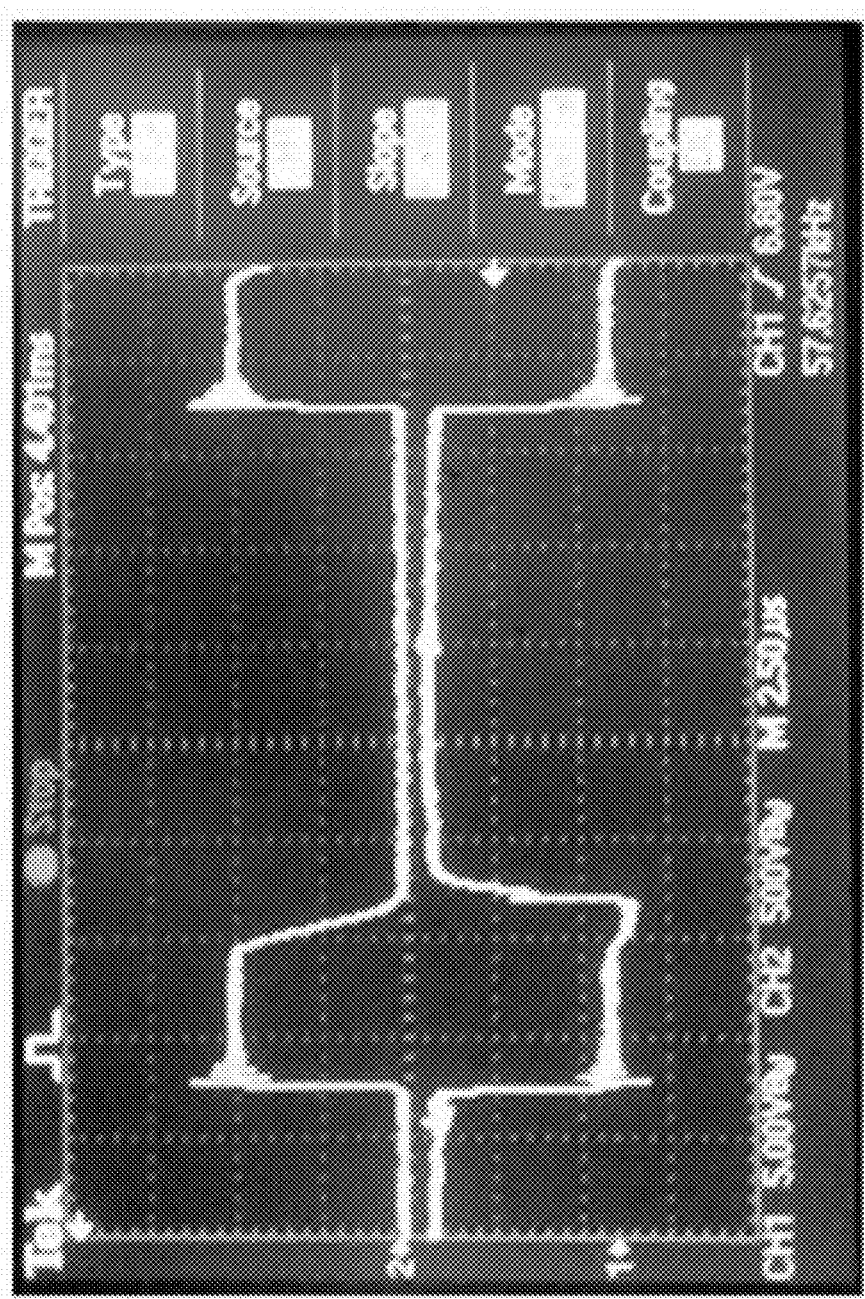
FIG. 8 depicts the drain and gate waveforms ZVS turn ON and OFF, with an input of 190 VDC and 800 W load, according to embodiments as disclosed herein.
Figure 9:
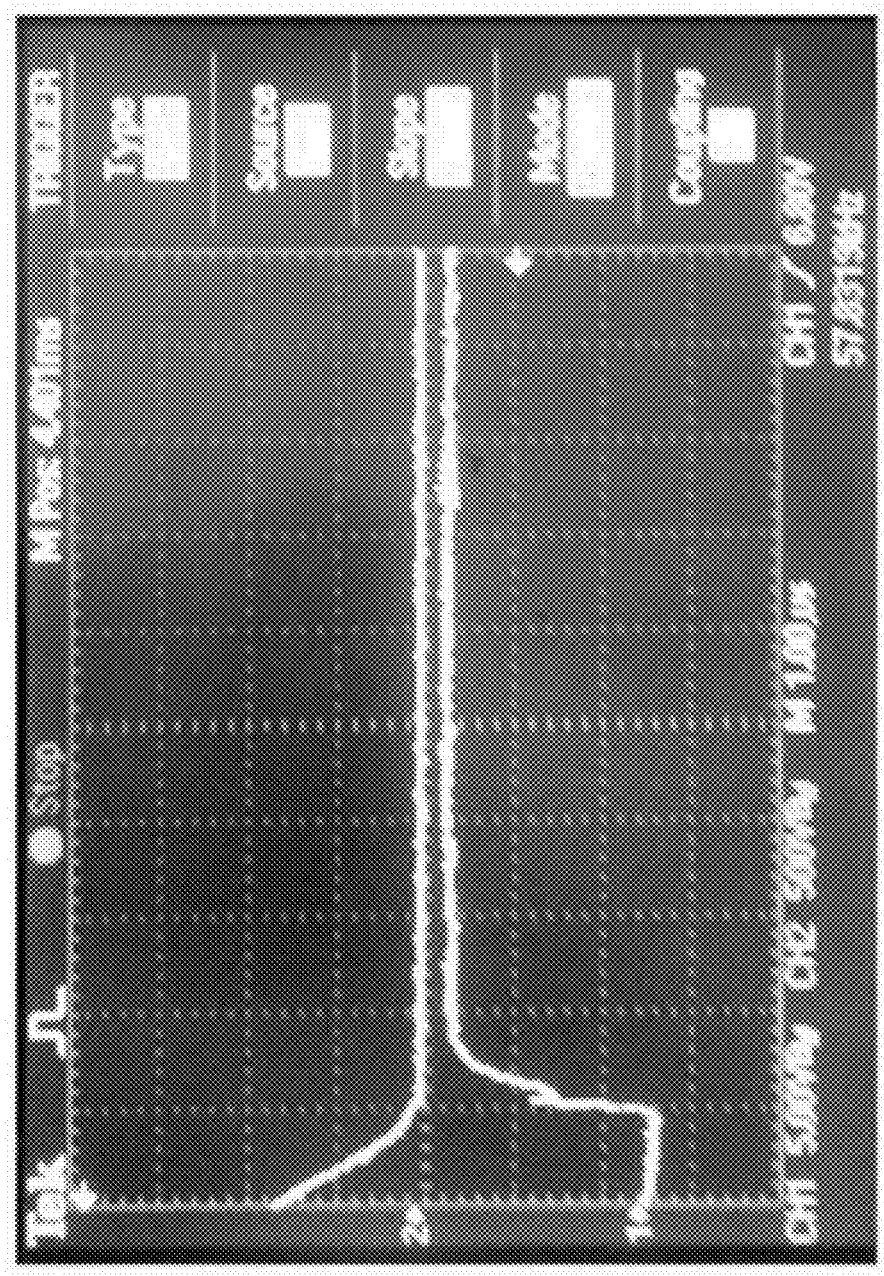
FIG. 9 depicts the drain and gate waveforms ZVS turn ON, with an input of 190 VDC and 800 W load, according to embodiments as disclosed herein.

FIGS. 8 and 9 depict the drain voltage and gate voltage waveforms indicating the ZVS condition during the turn ON and turn OFF conditions of the switch 104. FIG. 8 depicts the drain and gate waveforms ZVS turn ON and OFF, with an input of 190 VDC and 800 W load. FIG. 9 depicts the drain and gate waveforms ZVS turn on, with an input of 190 VDC and 800 W load. FIG. 9 specifically depicts the zero voltage turn on of the switch 104, where in the gate voltage rises to the threshold only after the drain voltage has attained zero value. These waveforms are for nominal DC input condition and full load output.

Figure 10:
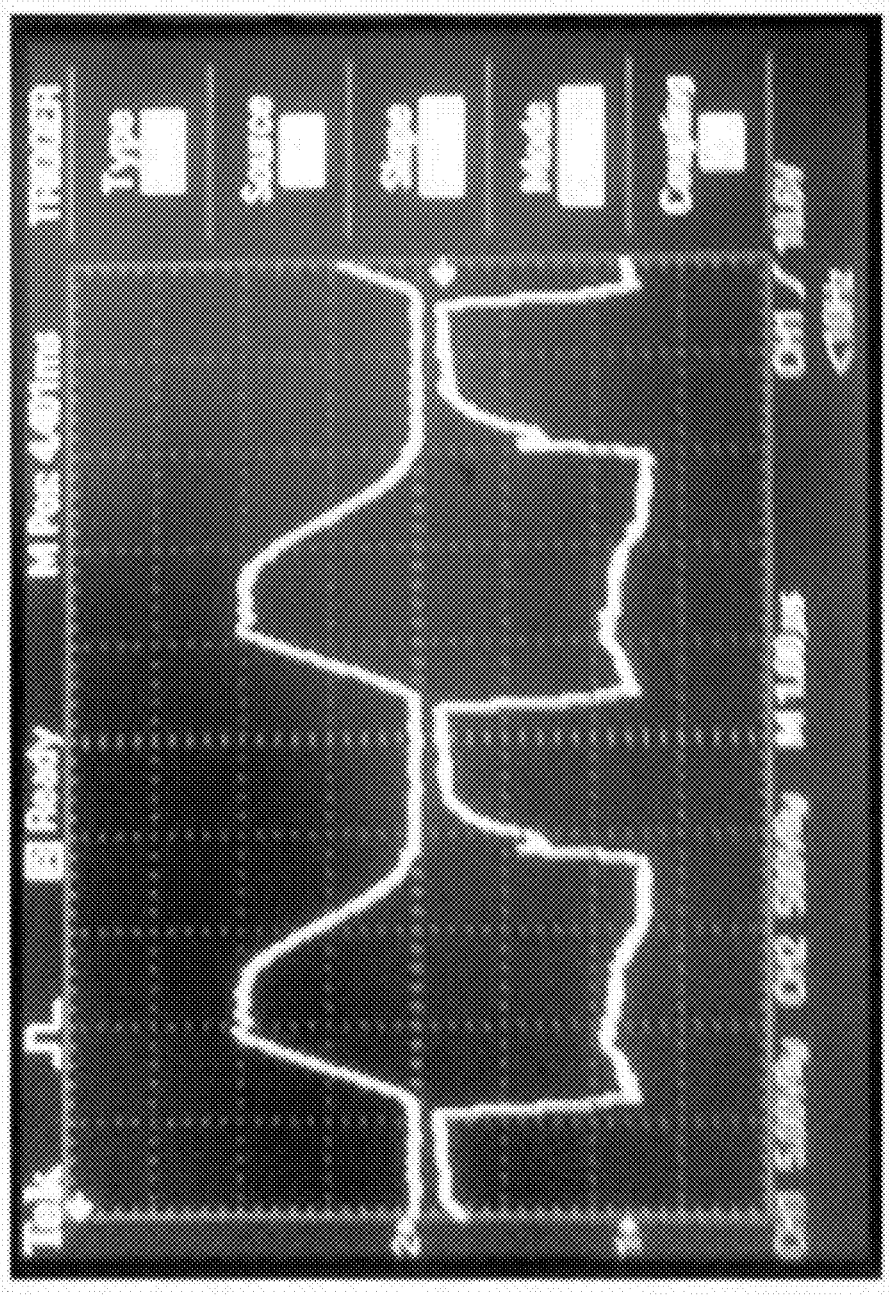
FIG. 10 depicts the drain and gate waveforms ZVS turn ON and OFF, with an input of 300 VDC and 300 W load, according to embodiments as disclosed herein.

FIG. 10 also depicts the gate and drain waveforms showing ZVS turn ON and turn OFF, but at 300V DC input and 300 watts output load.

The input AC current waveform shown here is without any line filter incorporated and it is very clearly seen that, even at power levels of about 800 watts, input current does not contain the high frequency component. The test data for DC input conditions were recorded for various conditions which included variable values of resonant elements $L_r$ and $C_r$. $L_r$ was varied from 200 micro henries to 100 micro henries and similarly $C_r$ was varied from 2000 pf to 1000 pf.

Figure 11A:
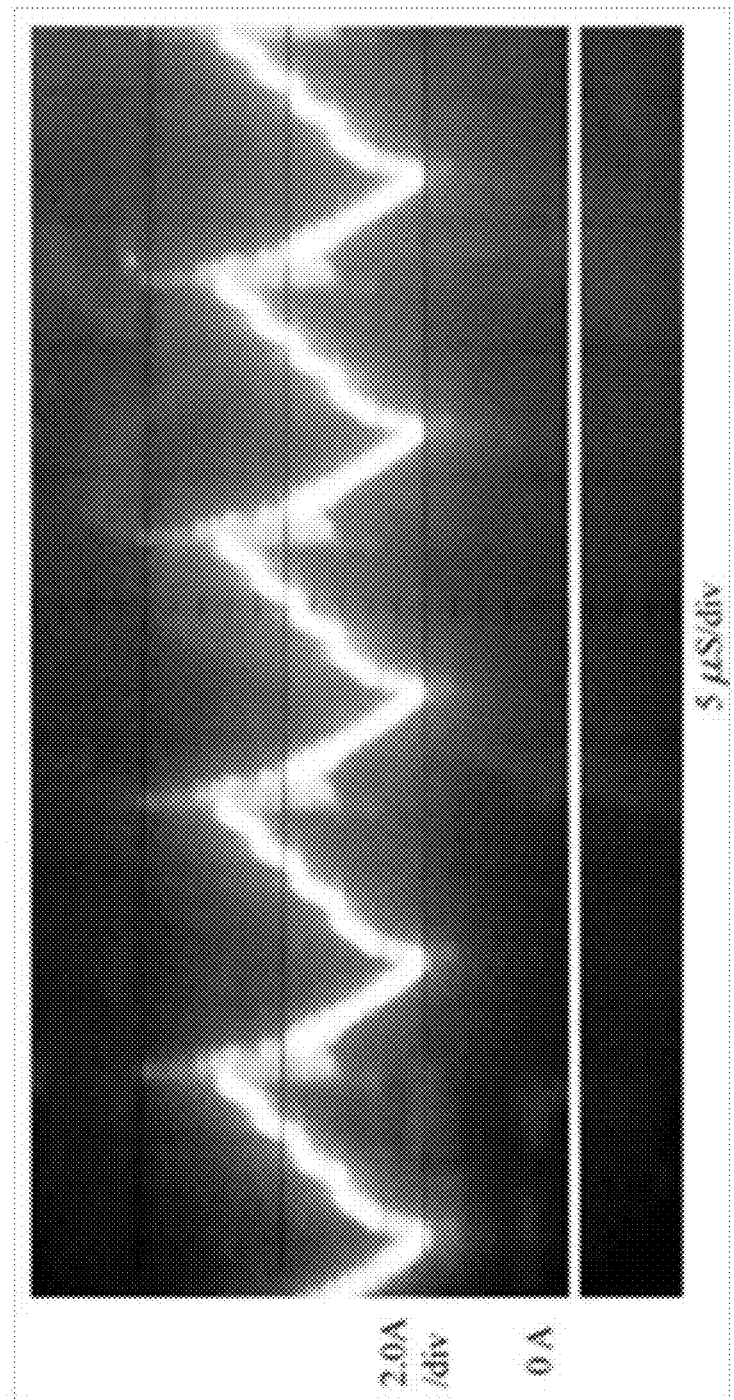
FIGS. 11A and 11B depict the continuous current condition for different input scenarios in the boost inductor, according to embodiments as disclosed herein.
Figure 11B:
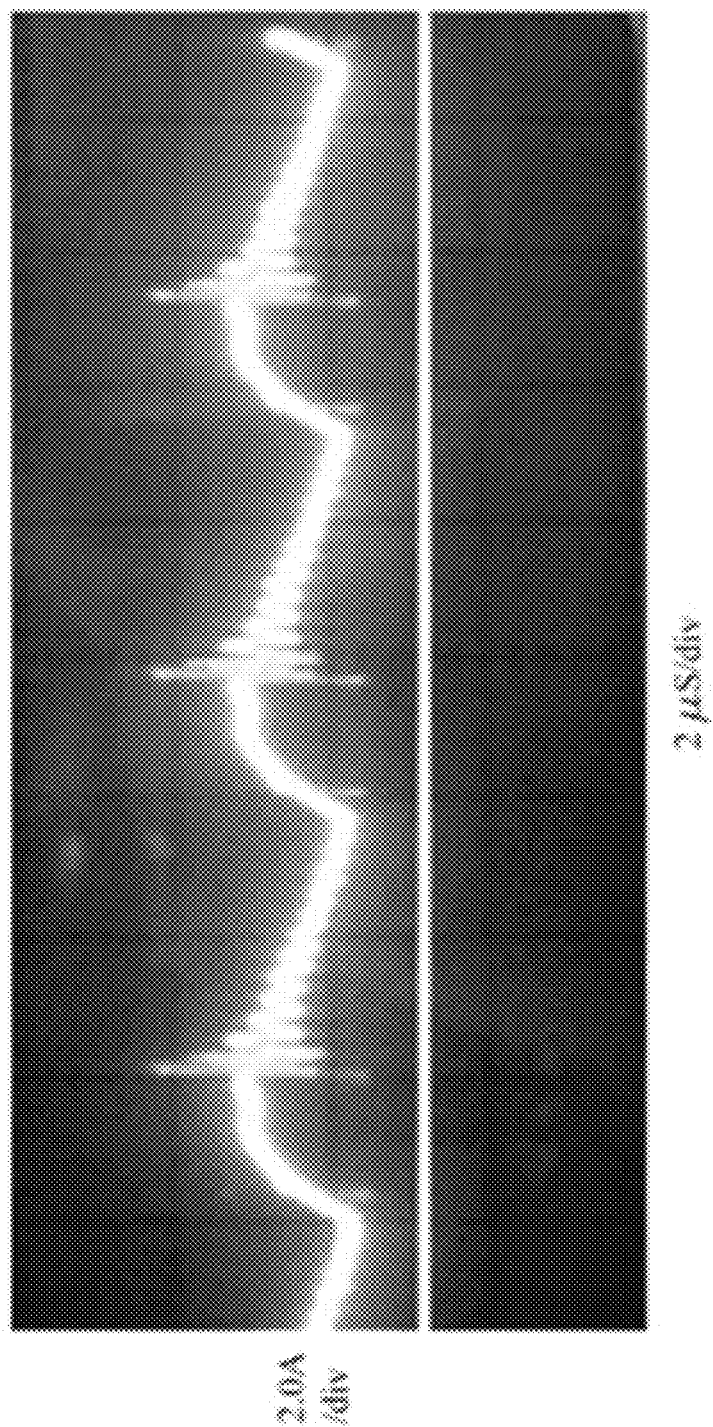

Computed frequencies closely matched with the practical observations. It is interesting to note that at 800 watts output power and a nominal input voltage of 220V DC, test data clearly depicts no change in the efficiency figures, even under large frequency variation due to change of resonant component values. It has been authenticated that total soft switching is achieved as the losses are not varying even with a large swing in the switching frequencies. Though the switching frequency varied from 72 KHZ to 161 KHz, efficiency remained around 97%. Optimal efficiency recorded at nominal input is 98.0% at 106 KHz with $L_r$ as 200 micro henries and $C_r$ of 1000 pf. The boost inductor input current shown in FIGS. 11a and 11b depict the CCM for different input scenarios.

The losses in the switch 104 are of important concern, as it is the prime focus of soft switching. Therefore, to estimate/or accurately measure the losses in the switch 104, one heat sink was calibrated for its thermal resistance to start with. A known amount of power (5.0 watts) was dissipated on the heat sink by way of mounting a 3 terminal linear regulator LM7812. After stabilization, the temperature rise was noted and thermal resistance calculated. It was 8.4° C./watt. Next, the MOSFET was mounted on the same calibrated heat sink and it was thermally isolated from the neighboring dissipating elements and the unit was run at different power levels of 400 watts, 600 watts and 800 watts.

For every condition of power up, sufficient time was allowed to stabilize the temperature rise. Noting the heat sink temperature, the power loss was estimated in the switch 104.

FIGS. 12A and 12B depict the performance of the converter with varying input voltage, $L_r$ and $C_r$.

Power dissipation in the switch 104 was recorded as 2 watts for 400 watts, 3 watts for 600 watts, 4 watts for 700 watts and 6 watts for 800 watts. For all the above tests, the input voltage set was 220 V DC.

As detailed above, a novel and simple soft switching CCM boost configuration is presented which is controlled by the BCM controller 109. Complete soft switching for the boost switch, boost diode and also the fly back diode is demonstrated. All the test data and waveforms are presented. A 800 watt PFC module has been built with the proposed technique and test results are published. It is shown that the boost switch losses are well below the normal levels and are independent of the switching frequency.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A boost converter comprising:
   a switch connected in series with a boost inductor, wherein the boost inductor comprises a first portion and a second portion and the second portion is primary of a flyback transformer connected in series with the switch; and
   a Boundary Conduction Mode (BCM) controller connected to a secondary winding of the flyback transformer, input of the boost converter and gate of the switch through a time delay circuit, wherein the gate of the switch is driven after a time delay provided by the time delay circuit, wherein the time delay is initiated by the BCM controller and the time delay is equal to half a resonant time of the second portion of the boost inductor and a resonant capacitance.

* * * * *